(12) United States Patent
Iiyama et al.

(10) Patent No.: US 6,260,915 B1
(45) Date of Patent: Jul. 17, 2001

(54) FORK LIFT TRUCK FRAME STRUCTURE

(75) Inventors: Hiroyuki Iiyama; Fumihiro Akahane, both of Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/620,907

(22) Filed: Jul. 20, 2000

(30) Foreign Application Priority Data

Feb. 10, 2000 (JP) ............................................. 2000-033392

(51) Int. Cl.⁷ .................................................... B60J 7/00
(52) U.S. Cl. ...................... 296/190.08; 296/70; 180/90; 180/89.12
(58) Field of Search ...................... 296/190.08, 190.09, 296/70; 180/90, 89.12

(56) References Cited

U.S. PATENT DOCUMENTS

| | | | | |
|---|---|---|---|---|
| 4,126,202 | * | 11/1978 | Hern .................................. | 180/89.12 |
| 4,447,860 | * | 5/1984 | Stone et al. ........................ | 296/70 X |
| 4,781,260 | * | 11/1988 | Morita et al. ...................... | 180/89.12 |
| 6,073,987 | * | 6/2000 | Lindberg et al. .................... | 296/70 |
| 6,098,739 | * | 8/2000 | Anderson et al. ............. | 180/89.12 X |

\* cited by examiner

*Primary Examiner*—Joseph D. Pape
(74) *Attorney, Agent, or Firm*—Wenderoth, Lind & Ponack, L.L.P.

(57) ABSTRACT

A fork lift truck frame structure includes a dash board side end portion, which is formed so as to permit an operator's entry and exit. The side end portion of the dash board (2) is cut off in order to form a tapered cut-off portion (4) and a side plate (3). The side plate (3) is bent along the cut-off portion (4) and is fitted to the cut-off portion (4).

3 Claims, 2 Drawing Sheets

FORK LIFT TRUCK FRAME STRUCTURE

BACKGROUND OF THE INVENTION

1. Field of the Invention

The present invention relates to a fork lift truck frame structure having a dash board and a side plate fitted thereto.

2. Description of the Prior Art

A fork lift truck, which is used for handling, carrying, lifting and the like at various work sites for machining, assembling, storing, etc., and the fork lift truck is usually needed to move and operate in narrow places where various manufacturing facilities exist or semi-finish products or finish products are placed, hence it is desired to make a fork lift truck body that is as compact as possible. On the other hand, if an example of a battery type fork lift truck having a battery as a power source is taken, in order to elongate a battery charging interval to improve a rate of operation, the battery to be mounted is needed to be of a larger capacity and it is desired to make a space for accommodating the power source as broad as possible.

Thus, in the fork lift truck, there are many cases where a space for an operator must be made as narrowly as possible. In the fork lift truck, there is a dash board in front of an operator's seat so that a space between the seat and the dash board is the space provided for the operator, and the operator gets in and out of this space from a side of the fork lift truck.

FIG. 2 is a perspective view of a prior art dash board portion in a fork lift truck frame structure having a dash board and a side plate fitted thereto. In FIG. 2, numeral 1 designates a front portion of a frame of a fork lift truck, in which a dash board 2 is provided along the height direction.

On each side end portion of the dash board 2, a side plate 3 is arranged such that a side edge of the dash board 2 and an upper end edge of the side plate 3 are joined together by welding. An operator's seat (not shown) is provided in the back of the dash board 2 (on the oblique right hand lower side of FIG. 2) so that a space between the operator's seat and the dash board 2 serves as the space for the operator.

As mentioned above, however, in is the present situation, the space for the operator must be designed as narrow as possible. Especially, in the space between the dash board and the operator's seat, there is protruding a corner, (shown as portion A of FIG. 2), and there is a problem that this corner becomes an obstacle when the operator gets in and out.

SUMMARY OF THE INVENTION

It is therefore an object of the present invention to provide a fork lift truck frame structure having a dash board and a side plate fitted thereto in which a structure of a side end portion of the dash board is improved so as to enhance the ease which an operator can get in and out.

In order to attain the mentioned object, the present invention employs a fork lift truck frame structure in which a side end portion of a dash board is cut off to form a cutoff portion and a side plate, which is bent along the cut-off portion, is fitted to the cut-off portion.

In the fork lift truck frame structure according to the present invention, as mentioned above, the side end portion of the dash board is cut off and the side plate is bent along the cut-off portion, hence the corner is eliminated at the side end portion of the dash board on the side of the operator's seat so that there is nothing protruding into the space for an operator to get in and out. Thus, when the operator gets in and out of the space between the dash board and the operator's seat, there occurs no inconvenience that the operator is caught on the corner, which in the prior art protrudes at the side end portion of the dash board.

DESCRIPTION OF THE PREFERRED EMBODIMENTS

Figure 1:
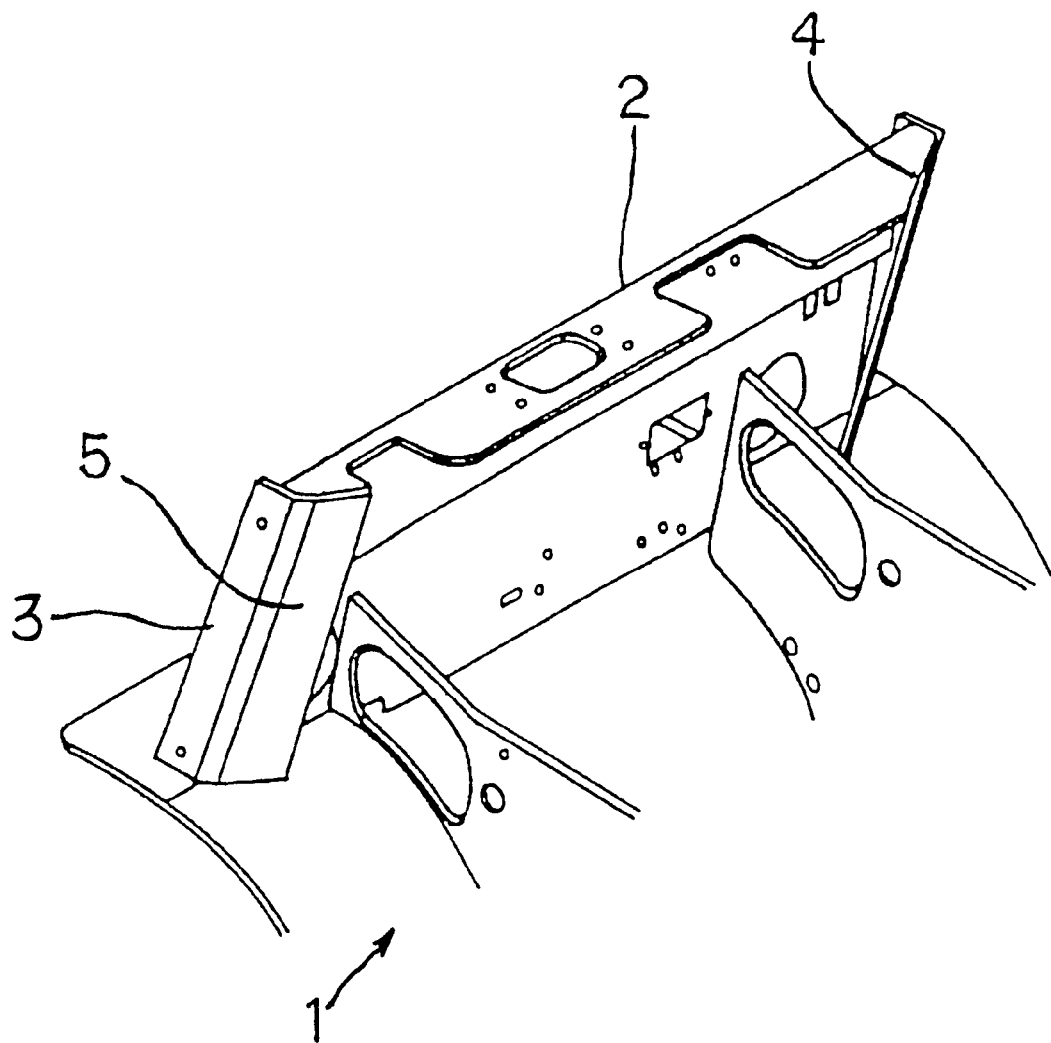
FIG. 1 is a perspective view of a dash board portion in a fork lift truck frame structure of an embodiment according to the present invention.

Herebelow, a fork lift truck frame structure having a dash board and a side plate fitted thereto according to the present invention will be described based on an embodiment shown in FIG. 1. It is to be noted that the same parts or components of the embodiment as those of the conventional device shown in FIG. 2 will be given the same reference numerals and repeated descriptions thereon are omitted for simplicity of explanation.

Figure 2:
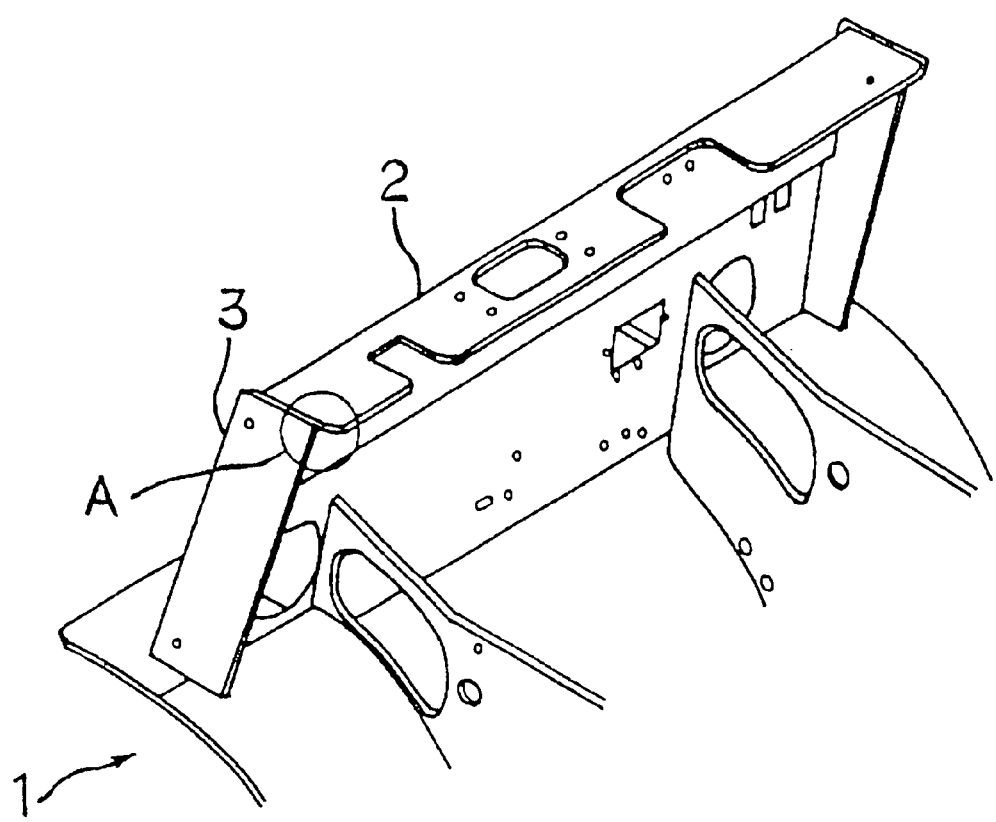
FIG. 2 is a perspective view of a dash board portion in a fork lift truck frame structure in the prior art.

In the frame structure shown in FIG. 2, each side end portion of the dash board 2 is cut off obliquely to form a cut-off portion 4 and a side plate 3, which is to be fitted to the side end portion of the dash board 2, is bent along the cut-off portion 4 to form a bent portion 5.

Hence, the novel dash board does not have a structure such as the corner shown in portion A of FIG. 2 at the side end portion of the dash board on the side of a space for an operator to get in and out of the operator space. Thus, there is no obstacle due to such protruding corner at the side end portion of the dash board when the operator gets in and out of the space between the dash board and an operator's seat in the back thereof.

According to the frame structure of the present embodiment, the operator may easily get in and out of a narrow operator's space of a fork lift truck.

It is understood that the invention is not limited to the particular construction and arrangement herein illustrated and described but embraces such modified forms thereof as come within the scope of the appended claims.

As mentioned above, the present invention provides a fork lift truck frame structure in which a side end portion of a dash board in a frame of a fork lift truck is cut off to form a cut-off portion and a side plate, bent along the cutoff portion, is fitted to the cut-off portion.

In the fork lift truck frame structure according to the present invention, as mentioned above, the side end portion of the dash board is cut off and the side plate is bent along the cut-off portion, hence there is eliminated a corner at the side end portion of the dash board on the side of an operator's seat so that there is no protruding portion in a space for an operator to get in and out and there occurs no inconvenience that the operator is caught on the corner which protrudes at the side end portion of the dash board, when the operator gets in and out of the space between the dash board and the operator's seat.

What is claimed is:

1. A fork lift truck frame structure comprising a dash board and an angled side plate connected to said dash board, said dash board including a first side end portion having an inwardly tapered portion, and said angled side plate is fitted to said first side end portion so as to extend along its length from said dash board to a floor portion of the fork lift truck frame structure, wherein said angled side plate conforms to the shape of said inwardly tapered portion.

2. A fork lift truck frame structure as claimed in claim 1, wherein said dash board has a second side end portion, and said second side end portion includes an inwardly tapered portion.

3. A fork lift truck frame structure as claimed in claim 1, wherein said first side end portion defines a structure that is inwardly tapered toward an operator space of said fork lift truck frame structure to facilitate operator entry into and exit from the operator space.

* * * * *